United States Patent
Hashimoto

(10) Patent No.: US 7,177,244 B2
(45) Date of Patent: Feb. 13, 2007

(54) OPTICAL DISC APPARATUS

(75) Inventor: Kiyokazu Hashimoto, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/567,418

(22) PCT Filed: Aug. 5, 2004

(86) PCT No.: PCT/JP2004/011584

§ 371 (c)(1),
(2), (4) Date: Feb. 6, 2006

(87) PCT Pub. No.: WO2005/015548

PCT Pub. Date: Feb. 17, 2005

(65) Prior Publication Data
US 2006/0215510 A1    Sep. 28, 2006

(30) Foreign Application Priority Data
Aug. 7, 2003   (JP) .............................. 2003-289306

(51) Int. Cl.
*G11B 7/00* (2006.01)
*G11B 5/09* (2006.01)
(52) U.S. Cl. ................... 369/44.34; 369/44.27; 369/59.21; 369/59.17
(58) Field of Classification Search .................... None
See application file for complete search history.

(56) References Cited

U.S. PATENT DOCUMENTS

| 5,339,302 | A | 8/1994 | Takahashi et al. |
| 6,744,706 | B2 * | 6/2004 | Miyagawa et al. ....... 369/44.13 |
| 6,912,190 | B2 | 6/2005 | Inokuchi et al. |
| 2002/0176340 | A1 * | 11/2002 | Yamamoto et al. ....... 369/53.15 |
| 2003/0165095 | A1 * | 9/2003 | Iimura et al. ............ 369/47.22 |

FOREIGN PATENT DOCUMENTS

| JP | 2002-074675 | 3/2002 |
| JP | 2002-216363 | 8/2002 |

* cited by examiner

*Primary Examiner*—Muhammad Edun
(74) *Attorney, Agent, or Firm*—Hamre, Schumann Mueller & Larson PC

(57) ABSTRACT

There are provided a balance adjustment circuit (6) for adjusting levels of first and second detection signals from a tracking detector, a differential circuit (8) for generating a difference signal between the adjusted first and second detection signals, an AD conversion circuit (10) for digitizing the difference signal, a wobble signal detection circuit (14) for detecting a wobble signal from the digitized difference signal, an adder circuit (30) for generating a sum signal of the adjusted first and second detection signals, a binarization circuit (32) for converting the sum signal into a binarized signal, a latch circuit (33) for latching the binarized signal and converting the same into a timing signal, a control signal generation circuit (34) for generating a control signal based on the timing signal and the digitized difference signal, a residual component removal circuit (18) for removing a residual signal component included in the digitized difference signal based on the control signal and outputting a LPP detection signal, and an address detection circuit (21) for detecting address information from the LPP detection signal. The wobble signal and the LPP signal are detected reliably with a simple configuration.

22 Claims, 7 Drawing Sheets

OPTICAL DISC APPARATUS

TECHNICAL FIELD

The present invention relates to an optical disk apparatus for recording or reproducing a signal on/from a digital optical disk.

BACKGROUND ART

As a format of optical disks for recording/reproducing information, DVD-R/RW is used. The first feature of the DVD-R/RW format is that address information is formed on a land in a gap portion between guide grooves (referred also as "grooves") on an optical disk to increase the compatibility with a DVD-ROM format. This address is referred to as a "land pre-pit address" or a "LPP address".

The second feature is that the guide grooves undulate in a radial direction in a certain cycle to form a wobble. A wobble signal obtained based on the wobble is used as a reference signal for generating a clock for recording and reproducing information.

This format will be described with reference to FIG. 6. FIG. 6 is a view schematically showing a shape of the grooves on an optical disk. A track as a region where information is to be recorded as a mark is formed of a groove 101. A land 102 is formed between the grooves 101. A recording mark 103 is formed in the groove 101, and a land pre-pit 104 is formed on the land 102. As shown in the figure, the grooves 101 undulate in a lateral direction, i.e., a radial direction of the optical disk, to form a wobble. In a DVD-R disk or a DVD-RW disk, a cycle of the wobble is 186 times that of a recording clock. The land pre-pit 104 is encoded with address information and is used to detect the exact position on the disk.

FIG. 6 shows a tracking detector 105. The tracking detector 105 is provided as a part of the elements of an optical head (not shown), and detects laser light reflected by the optical disk and generates a tracking servo signal for allowing the laser light to follow the groove 101. FIG. 6 shows a state in which the tracking detector 105 is divided into two tracking detectors A and B by a dividing line 106 extending in a direction of the tracks (track direction). In other words, the tracking detectors A and B are arranged side by side in the radial direction of the optical disk. Each of the tracking detectors A and B detects an amount of laser light reflected by the optical disk.

The detection signal from the tracking detector 105 is used to detect not only the tracking servo signal but also other signals. LPP address information is detected based on a differential signal indicating a difference between a plurality of light amount signals from the tracking detector 105. Recorded/reproduced information is detected based on a sum signal indicating a sum of the plurality of light amount signals. As in the case of detecting the address information, a wobble signal also is detected based on the differential signal indicating a difference between the plurality of light amount signals. FIG. 6 shows a state in which, in order to detect the wobble and the LPP address, the outputs from the detectors A and B are subjected to predetermined processing, then input to a wobble detection differential amplifier 107 and a LPP detection differential amplifier 108, and converted into differential signals indicating a difference therebetween.

As shown in FIG. 6, in a conventional optical disk apparatus, the wobble detection differential amplifier 107 and the LPP detection differential amplifier 108 are provided as separate elements (see, for example, JP 2002-216363 A). The reason for this is as follows.

In the DVD-R/RW format, the guide grooves for recording information are formed with the wobble as described above. Locally, the position of the optical head is displaced from the center of a track at a certain frequency with respect to the track. Consequently, in recording information, an imbalance is created between amounts of light incident on the two tracking detectors A and B, and a recording signal is mixed in an address signal.

Waveforms (a) to (d) in FIG. 7 are waveforms at respective portions in recording by the optical disk apparatus. The waveforms (a) and (b) are waveforms of the output signals from the tracking detectors A and B, respectively. Since the tracking detectors A and B detect reflected light of an identical light spot, when one of the detectors outputs a higher amount of light, the other outputs a lower amount of light. Further, both the tracking detectors A and B detect the land pre-pit 104, although their detection levels are different.

In FIG. 7, a recording signal component S indicated by a solid line, a wobble signal component W indicated by a dashed envelope, and LPP signals La and Lb are shown in an emphatic manner. The recording signal component S in the waveform (a) is in phase with that in the waveform (b). The wobble signal component W in the waveform (a) is in opposite phase to that in the waveform (b). The LPP signals La and Lb are located at right and left peaks, respectively, of the envelope indicating the wobble signal component W. At the left peak, the LPP signal La is shown, which corresponds to the case where a recording signal is irradiated on the LPP (irradiation of a peak power). At the right peak, the LPP signal Lb is shown, which corresponds to the case where the LPP is in a valley of irradiation of recording signals (irradiation of a bottom power). In the waveform (a), the output signal is higher than the envelope at a position of the LPP signal La on the left side. On the other hand, in the waveform (b), the output signal is lower than the envelope at a position of the LPP signal La on the left side. At the right peak, a component of the LPP signal Lb based on an amount of light by the bottom power is detected in opposite phase on the lower envelope.

The waveforms (c) and (d) are waveforms of difference signals obtained by subtracting the signal of the waveform (b) from the signal of the waveform (a). The waveform (c) shows the output from the wobble detection differential amplifier 107 in FIG. 6, corresponding to the case where an average value of the recording signal component S in the waveform (a) is equal to that in the waveform (b). The waveform (d) shows the output from the LPP detection differential amplifier 108, corresponding to the case where the recording signal component S in the vicinity of the peaks of the wobble signal where the LPPs are present in the waveform (a) is equal to that in the waveform (b). In either case, an imbalance amount of the recording signal component S varies in a cycle of the wobble signal in principle.

In the waveform (c), a residual component of the recording signal component S (hereinafter, referred to as a "residual signal component") is minimum in the vicinity of an average value of the difference signal, is maximum in the vicinity of the peaks of the wobble signal where the LPP signals La and Lb are present, and is maximum in a negative direction in the vicinity of an opposite phase of the wobble signal. In the waveform (d), the residual signal component is minimum in the vicinity of the peaks of the wobble signal where the LPP signals La and Lb are present, is maximum in a negative direction in the vicinity of an opposite phase thereto, and is substantially equal to the negative peak value in the waveform (c) in the vicinity of the average value.

In subtracting the signal of the waveform (b) from the signal of the waveform (a), when an appropriate balance is set in level between these signals, the LPP signal La on the left side can be detected in both the waveforms (c) and (d). On the other hand, the LPP signal Lb on the right side in the waveform (c) is buried in the residual signal component and cannot be detected.

As described above, when the differential balance is adjusted so that average amounts of light incident on the two tracking detectors A and B are equal, the wobble signal can be detected accurately by using the center of the amplitude of the differential output as shown in the waveform (c) in FIG. 7. However, in the waveform (c), it is sometimes difficult to detect the land pre-pit of the LPP signal Lb. The reason for this is as follows. The land pre-pit is recorded at a position where the optical head is off-track relatively for wobble processing. Thus, mixing of the recording signal becomes maximum at the recording position, and in the case of irradiation of the bottom power, the LPP signal is buried in the residual signal component. To avoid this, the amplitude of the recording signal is detected at the recording position of the land pre-pit, and the differential balance outputs from the tracking detectors A and B are adjusted to be equal at that position. Consequently, as shown in the waveform (d) in FIG. 7, mixing of the recording signal component can be minimized at the recording position of the land pre-pit. As a result, the detection rate of the land pre-pit can be increased.

However, in the differential balance outputs adjusted as in the waveform (d) in FIG. 7, jitter is increased in a binarized wobble signal, and the above processing is not suitable for the binarized wobble signal. In general, the binarization of the wobble signal is performed by a method of binarizing the wobble signal that has passed through a band-pass filter at a certain slice level or by a duty feedback slice method in which the binarized signal has a duty ratio of 50%. However, by using either method, when the wobble signal output from a band-pass filter is binarized in the vicinity of the center of the amplitude, jitter is increased in the binarized wobble signal. The reason for this is as follows. When the differential balance is output so as to increase the detection rate of the land pre-pit, mixing of the recording signal component is minimized at the recording position of the land pre-pit, but is increased on the contrary in the vicinity of the slice level of the wobble signal.

With the foregoing in mind, it is found that the optimum adjustment point is different between the adjustment of the differential balance for detecting the wobble and that for detecting the land pre-pit. To cope with this, in the conventional example described in JP 2002-216363 A, a wobble detection balance adjustment circuit for adjusting the outputs from the two tracking detectors A and B for detecting the wobble and a LPP detection balance adjustment circuit for adjusting the outputs for detecting the land pre-pit are provided as separate elements. Accordingly, in order to output the differential signals between the outputs from the two balance adjustment circuits, the two differential amplifiers, i.e., the wobble detection differential amplifier 107 and the LPP detection differential amplifier 108 are provided as separate elements. With this configuration, both the wobble signal and the land pre-pit can be detected accurately.

As described above, the conventional optical disk apparatus requires the two balance adjustment circuits and differential amplifier circuits for detecting the wobble and the LPP, respectively. When an analog circuit is increased in scale, it consumes a larger amount of power, and the operation becomes unstable due to a circuit offset and temperature characteristics. To cope with this, it is necessary to provide a countermeasure circuit, which, however, degrades an S/N and is unfavorable for delicate detection of a signal having various patterns. However, when such processing by an analog circuit is to be performed digitally, two high-speed and high-accuracy analog-to-digital converters are required. A high-speed and high-accuracy analog-to-digital converter has a large circuit scale and consumes a large amount of power as compared with other analog circuits or a digital arithmetic circuit even at the present time when circuits have become miniaturized and faster. Therefore, it is desirable to minimize the use of a high-speed and high-accuracy AD converter.

DISCLOSURE OF INVENTION

An object of the present invention is to provide an optical disk apparatus that can detect a wobble signal and a LPP signal with a simple configuration.

An optical disk apparatus of the present invention reads predetermined information including address information for determining a position and wobble information from an optical disk having tracks in which information is to be recorded and that form a wobble of a predetermined cycle and gap portions between the tracks in which the address information is recorded.

In order to achieve the above object, an optical disk apparatus with a first configuration of the present invention includes: an optical head having a tracking detector for detecting a first detection signal and a second detection signal by first and second detectors, respectively, arranged on both sides of a dividing line that extends in a longitudinal direction of the tracks, based on reflected light of a laser beam irradiated onto the optical disk; a wobble detection balance adjustment circuit for receiving the first detection signal and the second detection signal, making an adjustment so that a signal level of the first detection signal is equal to a signal level of the second detection signal, and outputting the respective detection signals; a wobble detection differential circuit for generating a wobble detection differential signal indicating a difference between the first detection signal and the second detection signal whose signal levels have been adjusted by the wobble detection balance adjustment circuit; an analog-to-digital conversion circuit for digitizing the wobble detection differential signal generated by the wobble detection differential circuit; a wobble signal detection circuit for detecting a wobble signal based on the wobble detection differential signal digitized by the analog-to-digital conversion circuit; an adder circuit for generating a sum signal indicating a sum of the first detection signal and the second detection signal whose signal levels have been adjusted by the wobble detection balance adjustment circuit; a binarization circuit for comparing the sum signal generated by the adder circuit with a predetermined level of signal, and converting the sum signal into a binarized signal; a latch circuit for latching the output signal from the binarization circuit with a conversion clock of the analog-to-digital conversion circuit or a clock with a frequency that is an integral multiple of a frequency of the conversion clock, and converting the output signal into a recording timing signal; a control signal generation circuit for generating a control signal for removing a residual signal component as a residual component of a recording signal included in the digitized wobble detection differential signal, based on the recording timing signal output from the latch circuit and the digitized wobble detection differential signal; a residual component removal circuit for removing the residual signal component included in the digitized wobble detection difference signal based on the control signal supplied from the control signal generation circuit, so as to extract a land pre-pit detection signal; and an address detection circuit for detecting the address information based on the land pre-pit detection signal output from the residual component removal circuit.

An optical disk apparatus with a second configuration of the present invention includes: an optical head having a tracking detector for detecting a first detection signal and a second detection signal by first and second detectors, respectively, arranged on both sides of a dividing line that extends in a longitudinal direction of the tracks, based on reflected light of a laser beam irradiated onto the optical disk; a recording signal generation circuit for generating a recording signal for recording information in the tracks; a laser driving circuit for driving a laser of the optical head based on the recording signal output from the recording signal generation circuit; a reproduction signal generation circuit for detecting the recording signal recorded in the tracks, and outputting a reproduction signal; a wobble detection balance adjustment circuit for receiving the first detection signal and the second detection signal, making an adjustment so that a signal level of the first detection signal is equal to a signal level of the second detection signal, and outputting the respective detection signals; a wobble detection differential circuit for generating a wobble detection differential signal indicating a difference between the first detection signal and the second detection signal whose signal levels have been adjusted by the wobble detection balance adjustment circuit; an analog-to-digital conversion circuit for digitizing the wobble detection differential signal generated by the wobble detection differential circuit; a wobble signal detection circuit for detecting a wobble signal based on the wobble detection differential signal digitized by the analog-to-digital conversion circuit; a control signal generation circuit for generating a control signal for removing a residual signal component as a residual component of a recording signal included in the digitized wobble detection differential signal based on a recording timing signal obtained based on at least one of the output signals from the recording signal generation circuit and the reproduction signal generation circuit and the wobble detection differential signal; a residual component removal circuit for removing the residual signal component included in the digitized wobble detection difference signal based on the control signal supplied from the control signal generation circuit, so as to extract a land pre-pit detection signal; and an address detection circuit for detecting the address information based on the land pre-pit detection signal output from the residual component removal circuit.

DESCRIPTION OF THE INVENTION

Figure 1:
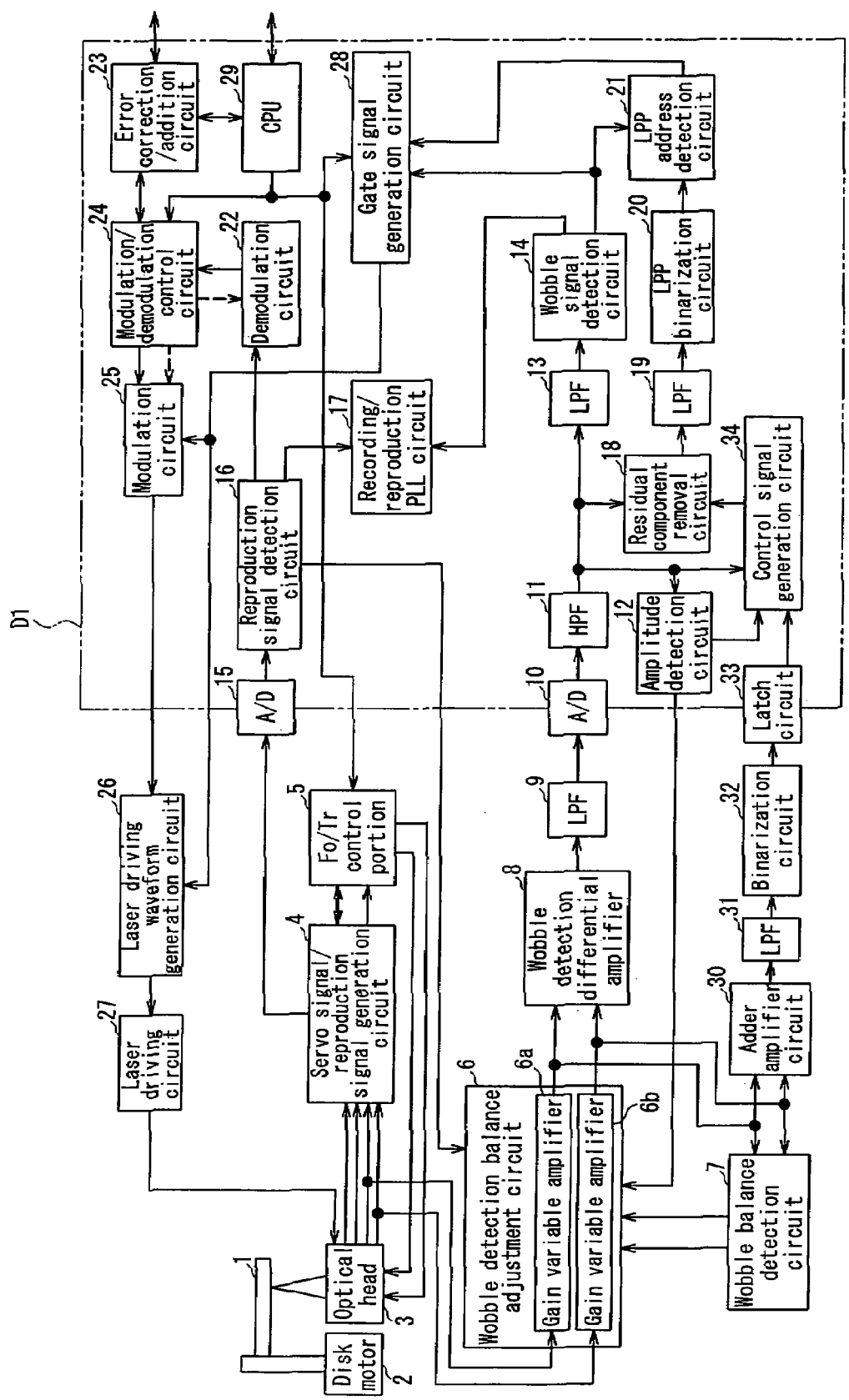
FIG. 1 is a block diagram showing a configuration of an optical disk apparatus according to Embodiment 1.

According to an optical disk apparatus of the present invention, it is possible to obtain optimum conditions for detecting a wobble signal and a LPP signal, respectively, by using only one wobble detection balance adjustment circuit and one wobble detection differential circuit. Therefore, the wobble signal and the LPP signal can be detected with a simple configuration.

The optical disk apparatus of the present invention further can include: an amplitude detection circuit for detecting an amplitude of a mixed signal of the wobble signal included in the digitized wobble detection differential signal and the residual signal component correlated with the sum signal, the recording signal, or the reproduction signal, wherein the wobble detection balance adjustment circuit can include a first gain variable amplifier for varying the level of the first detection signal, and a second gain variable amplifier for varying the level of the second detection signal, and the wobble detection balance adjustment circuit can have a first function of adjusting a gain of the first gain variable amplifier and a gain of the second gain variable amplifier so that the level of the first detection signal is equal to the level of the second detection signal, a second function of adjusting the gains of the first gain variable amplifier and the second gain variable amplifier so that the mixed signal is input to the analog-to-digital conversion circuit at a predetermined level based on the output from the amplitude detection circuit, and a third function of making the gains of the first gain variable amplifier and the second gain variable amplifier constant when reproduction is performed from a track in which the recording signal is not recorded.

Further, the control signal generation circuit can generate as the control signal an approximate residual signal that is approximate to the residual signal component, and the residual component removal circuit can subtract the approximate residual signal from the residual signal component having the same polarity as that of the land pre-pit.

In this configuration, preferably, the approximate residual signal is a signal generated by approximating a recording signal waveform based on a write strategy adopted by the optical disk apparatus to that of the wobble detection differential signal that has passed through the recording/reproduction system and the signal processing system of the optical disk apparatus.

In the above configuration, the control signal generation circuit can generate as the control signal an approximate residual signal that is approximate to the residual signal component, and set an amplitude of the approximate residual signal based on the output from the amplitude detection circuit; and the residual component removal circuit can subtract the approximate residual signal from the residual signal component having the same polarity as that of the land pre-pit.

In the above configuration, when a waveform obtained as a result of the subtraction by the residual component removal circuit includes a portion exceeding a predetermined level, the portion exceeding the predetermined level can be replaced by a reference level signal.

The residual component removal circuit can replace the residual signal component included in the digitized wobble detection differential signal with a reference level signal during a period corresponding to the recording timing signal.

The reference level signal can be a signal generated based on a low-frequency component in a portion that does not correspond to the residual signal component in the digitized wobble detection differential signal.

During a period in which the land pre-pit signal is located at a position where a recording signal is detected, a signal that is not subjected to the processing of removing the residual signal component can be used as the land pre-pit detection signal.

In the optical disk apparatus with the second configuration of the present invention, the control signal generation circuit can include an optimum timing detection circuit for generating a plurality of test timing signals by shifting a timing of the recording timing signal in units of clock, comparing levels of the residual signal component in the digitized wobble detection differential signal in periods corresponding to the respective test timing signals, and selecting a test timing signal corresponding to a period in which the absolute value level of the residual signal component is the highest, and use the selected test timing signal as the recording timing signal for generating the control signal.

In this configuration, the optimum timing detection circuit can select one of the test timing signals arbitrarily, cumulatively add values obtained by subtracting an absolute value level of the residual signal component corresponding to the selected test timing signal from absolute value levels of the residual signal component corresponding to test timing signals before and after the selected test timing signal, respectively, and, when either of the cumulative values reaches a predetermined positive level, select a test timing signal on a side of the cumulative value that reaches the predetermined positive level as an output signal, and perform the above processing repeatedly with respect to the selected test timing signal.

Hereinafter, embodiments of the present invention will be described with reference to the drawings.

(Embodiment 1)

FIG. 1 is a block diagram showing a configuration of an optical disk apparatus according to Embodiment 1 of the present invention. A block D1 defined by a chain double-dashed line is a block for processing a signal mainly by digitization.

Figure 6:
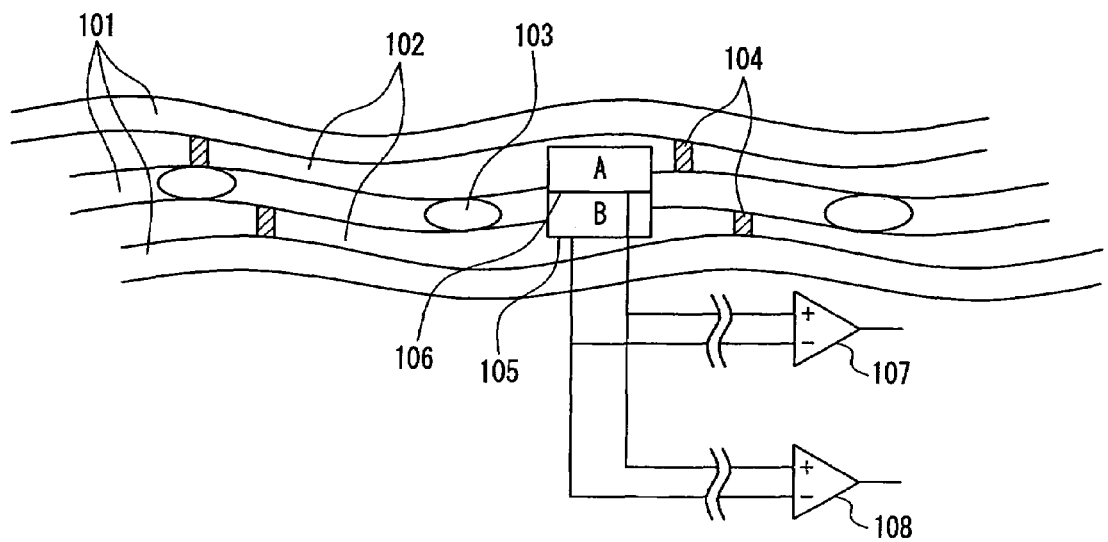
FIG. 6 is a plane view schematically showing a shape of grooves on an optical disk and a tracking detector.

An optical disk 1 is driven rotationally by a disk motor 2, and an optical head 3 irradiates a laser beam onto the optical disk 1 and detects light amount signals based on reflected light. As the optical disk 1, a disk having a format as shown in FIG. 6, such as a DVD-R/RW disk, for example, is used. The optical head 3 has a detector with a well-known structure, which is not shown. Based on the light amount signals detected by the detector, a servo signal/reproduction signal generation circuit 4 generates a focus error signal, a tracking error signal, and a reproduction signal. Based on the output signal from the servo signal/reproduction signal generation circuit 4, a focus/tracking (Fo/Tr) control portion 5 performs control so that the optical head 3 follows a guide groove formed on the optical disk 1.

The optical head 3 has two tracking detectors A and B as shown in FIG. 6 as a part of the detector. The outputs from the tracking detectors A and B also are supplied to a wobble detection balance adjustment circuit 6. The wobble detection balance adjustment circuit 6 has two gain variable amplifiers 6a and 6b that adjust gains of the outputs from the tracking detectors A and B, respectively. The outputs from the gain variable amplifiers 6a and 6b are supplied to a wobble balance detection circuit 7 and a wobble detection differential amplifier 8. The wobble balance detection circuit 7 detects a signal balance between the output signals from the gain variable amplifiers 6a and 6b, and optimizes a gain balance for detecting a wobble. The wobble detection differential amplifier 8 calculates a difference between the two output signals from the gain variable amplifiers 6a and 6b and outputs a difference signal.

The output signal from the wobble detection differential amplifier 8 has its high-frequency component blocked by a low-pass filter (LPF) 9 so as to be limited to a band suitable for analog-to-digital conversion. The band-limited different signal is digitized by an analog-to-digital (A/D) converter 10. The digitized difference signal has its DC offset caused by the A/D conversion removed by a high-pass filter (HPF) 11. The output from the HPF 11 is supplied to an amplitude detection circuit 12, a control signal generation circuit 34, a residual component removal circuit 18, and a low-pass filter (LPF) 13.

The amplitude detection circuit 12 detects a mixed component of a wobble signal component and a residual signal component due to an imbalance of a recording/reproduction signal in the digitized difference signal, and generates a signal for controlling the gains in the wobble detection balance adjustment circuit 6 so that the difference signal is input to the A/D converter 10 at a predetermined ratio of the mixed component to a LPP signal component.

The LPF 13 extracts the wobble signal component from the output signal from the HPF 11. Based on the output signal from the LPF 13, a wobble signal detection circuit 14 detects a binarized wobble signal and supplies the same to a recording/reproduction PLL circuit 17.

An analog-to-digital converter 15 is supplied with the reproduction signal output from the servo signal/reproduction signal generation circuit 4, and digitizes the same. Based on the digitized reproduction signal, a reproduction signal detection circuit 16 detects clock phase information and the presence/absence of the reproduction signal. The output from the reproduction signal detection circuit 16 is supplied, on one hand, to the recording/reproduction PLL circuit 17.

The recording/reproduction PLL circuit 17 has a phase comparator, a loop filter, a frequency variable oscillator, and the like. In recording, the recording/reproduction PLL circuit 17 synchronizes a clock with the wobble signal based on the wobble phase information of the wobble signal output from the wobble signal generation circuit 14. In reproduction, the recording/reproduction PLL circuit 17 synchronizes a clock with the reproduction signal based on the reproduction signal phase information of the reproduction signal output from the reproduction signal detection circuit 16.

The residual component removal circuit 18 removes the residual signal component that hinders detection of a LPP from the output signal of the HPF 11. The configuration for the removal will be described later. Based on the output signal from the residual component removal circuit 18 from which the imbalance component has been removed, a low-pass filter (LPF) 19 for extracting a low-frequency component removes an unwanted component so as to extract the LPP signal component. A LPP binarization circuit 20 binarizes the output signal from the LPF 19. Based on the output signals form the LPP binarization circuit 20 and the wobble signal detection circuit 14, a LPP address detection circuit 21 detects a land pre-pit address signal.

A demodulation circuit 22 demodulates a recording signal based on the reproduction signal data output from the reproduction signal detection circuit 16. An error correction/addition circuit 23 adds a correction code to recorded data of a user, or in reproducing the data, corrects the demodulated data output from the demodulation circuit 22 based on the correction code, via an interface connected to the optical disk apparatus. Thus, a modulation/demodulation control circuit 24 is supplied with the demodulated data output from the demodulation circuit 22 and sends the same to the error correction/addition circuit 23. Further, the modulation/demodulation control circuit 24 sends the data to which the error correction code has been added by the error correction/addition circuit 23 to a modulation circuit 25, and controls the operations of the modulation circuit 25 and the demodulation circuit 22.

The modulation circuit 25 modulates the user data to which the correction code has been added. Based on the output signal from the modulation circuit 25, a laser driving waveform generation circuit 26 generates a driving waveform for driving a laser, and a laser driving circuit 27 drives the laser with the driving waveform.

A gate signal generation circuit 28 generates a timing signal necessary for recording/reproducing data based on the output signals from the wobble signal detection circuit 14 and the LPP address detection circuit 21, and supplies the same to the respective portions. A CPU 29 controls the operation of each of the elements constituting the disk apparatus.

The two output signals from the gain variable amplifiers 6a and 6b also are supplied to an adder amplifier circuit 30. The adder amplifier circuit 30 adds the two output signals from the gain variable amplifiers 6a and 6b together to output a sum signal. A low-pass filter (LPF) 31 blocks a high-frequency component of the sum signal in substantially the same manner as the low-pass filter 9, so that it is limited to a band suitable for binarization. A binarization circuit 32 detects the timing of the presence/absence of the sum signal, and performs binarization. A latch circuit 33 latches the output signal from the binarization circuit 32 with an A/D conversion clock of the analog-to-digital converter 10 or a clock having a frequency that is an integral multiple of a frequency of the A/D conversion clock, and supplies the same to digitization.

The control signal generation circuit 34 generates a control signal for allowing the residual component removal circuit 18 to remove the residual signal component from the output signal of the high-pass filter 11, based on the output signals from the latch circuit 33 and the amplitude detection circuit 12. More specifically, the control signal is such that an amplitude of a timing signal output from the latch circuit 33 that corresponds to the residual signal component is adjusted in magnitude to an amplitude of the residual signal component to be removed, based on the output signal from the amplitude detection circuit 12.

The operations for detecting the wobble signal and the LPP signal in the thus-configured optical disk apparatus will be described below. The outputs from the tracking detectors A and B (see FIG. 6) provided in the optical head 3 are subjected to predetermined processing, and then input to the wobble detection balance adjustment circuit 6. The gain balance between the input signals is adjusted based on the signals from the wobble balance detection circuit 7, so that the gains are adjusted based on the output signal from the amplitude detection circuit 12 by the gain variable amplifiers 6a and 6b, and then the thus-obtained input signals are converted into the difference signal by the wobble detection differential amplifier 8.

The difference signal has its band limited by the LPF 9, is digitized by the analog-to-digital converter 10, and further has its band limited by the HPF 11 and the LPF 13. As a result, the wobble signal is detected by the wobble signal detection circuit 14. The difference signal digitized by the analog-to-digital converter 10 has its residual signal component removed by the residual component removal circuit 18, and further has its band limited by the LPF 19. As a result, the LPP signal is detected by the LPP binarization circuit 20.

Next, a description will be given of the operation for removing the residual signal component by the residual component removal circuit 18 based on the control signal from the control signal generation circuit 34, with reference to a waveform diagram in FIG. 2.

Figure 2:
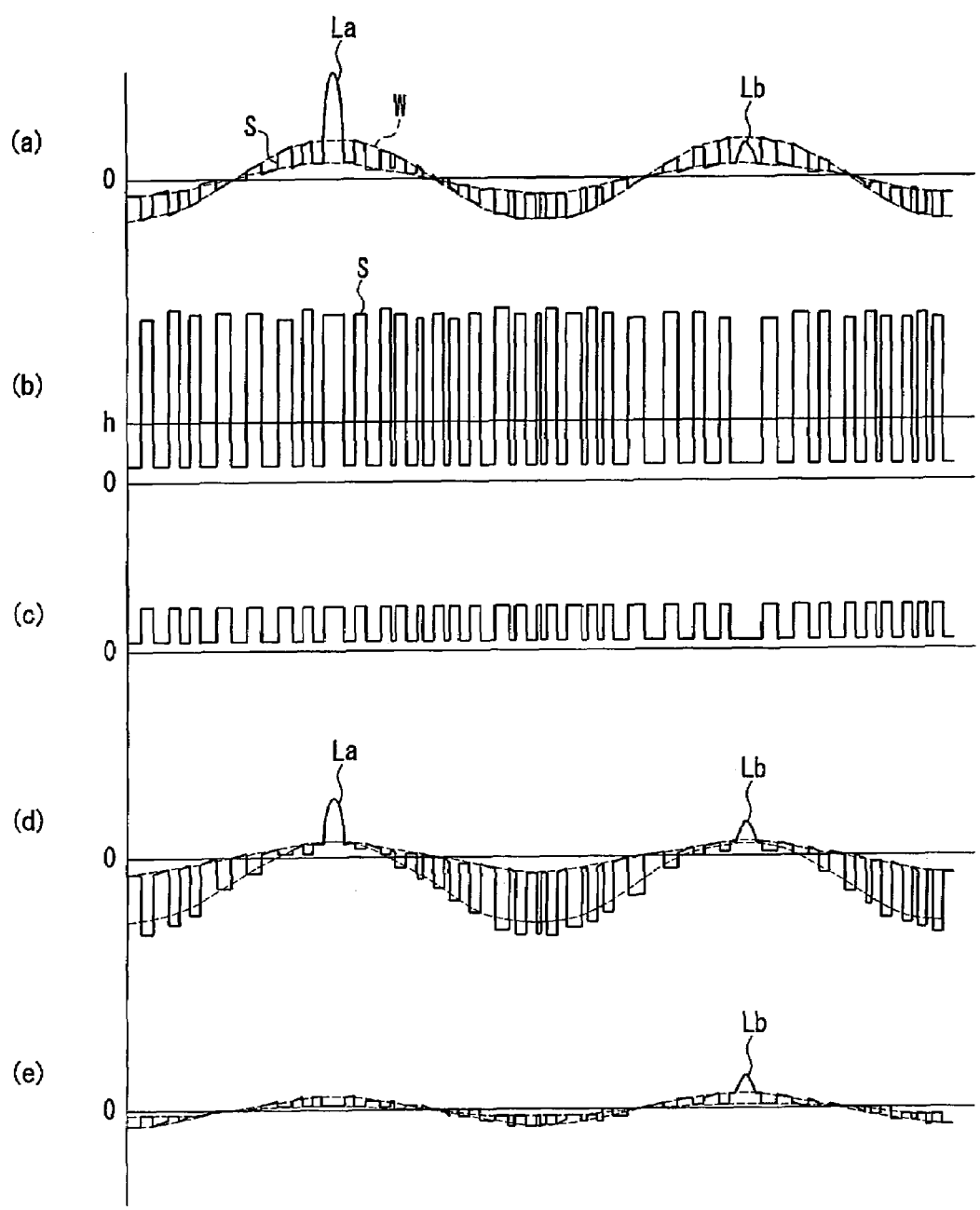
FIG. 2 is a waveform diagram for explaining an operation of the optical disk apparatus.
Figure 7:
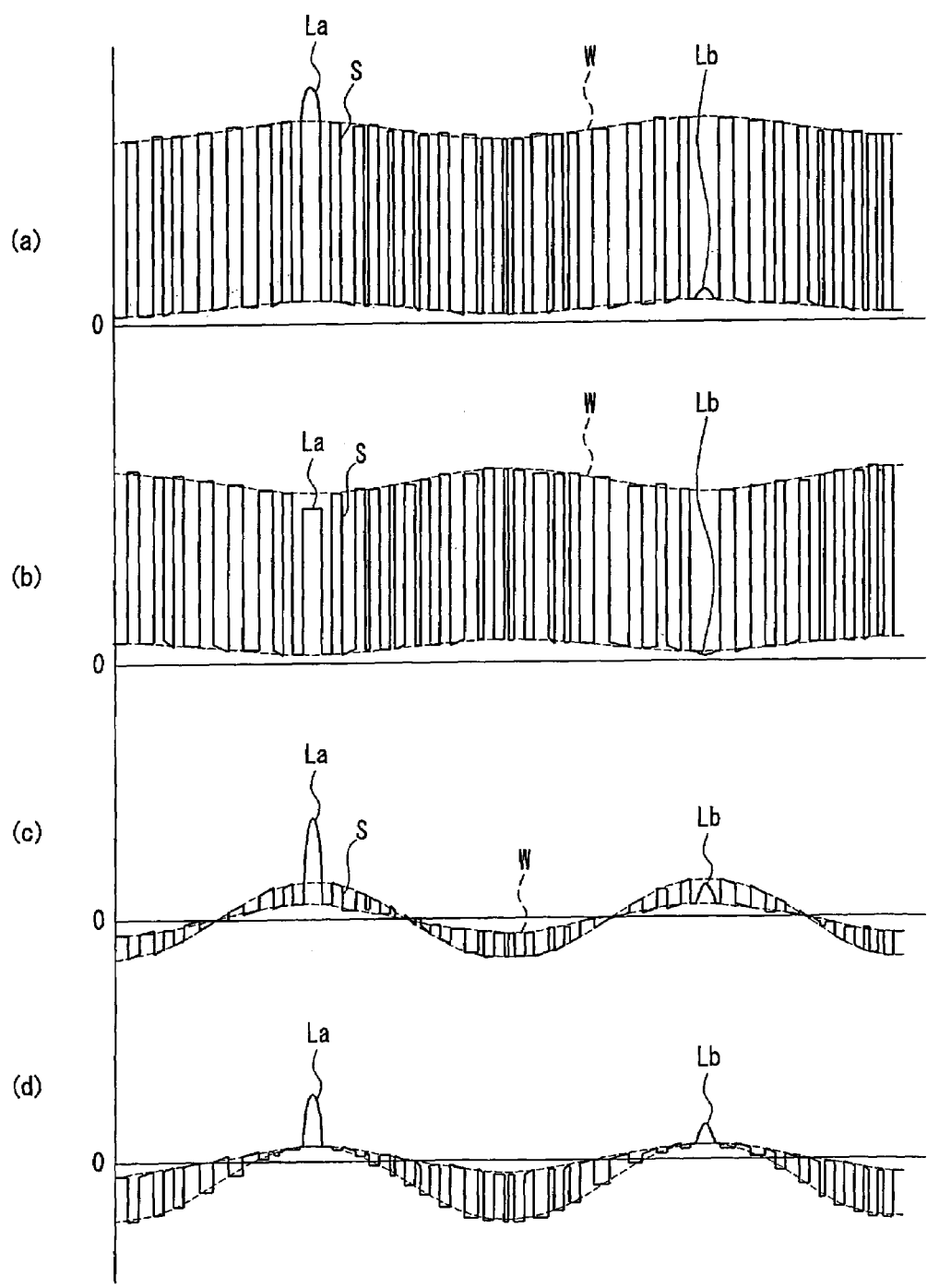
FIG. 7 is a waveform diagram showing an operation of a conventional optical disk apparatus.

A waveform (a) in FIG. 2 shows the output from the wobble detection differential amplifier 8, i.e., the difference signal between the outputs from the gain variable amplifiers 6a and 6b, and this waveform is the same as the waveform (c) in FIG. 7. A waveform (b) shows the output from the adder amplifier circuit 30, i.e., the sum signal of the outputs from the gain variable amplifiers 6a and 6b. The sum signal is a recording signal, from which the wobble signal and the LPP signal are cancelled, and has its amplitude stabilized with only a slight variation due to noise and the like. A waveform (c) shows a signal binarized by the binarization circuit 32 at a comparison level h shown in the waveform (b).

A waveform (d) is a waveform obtained by subtracting the binarized signal of the waveform (c) set at an appropriate level from the difference signal shown in the waveform (a). When the residual signal component included in the waveform (a) is in agreement with the binarized signal of the waveform (c) in phase and width, and when an amplitude of the binarized signal is not less than a maximum value of the residual signal component on a LPP signal side in the waveform (a), the residual signal component in the waveform (d) is entirely not more than an envelope on a base side in the case of irradiation of a bottom power. Although this subtraction processing corresponds to the operation of the residual component removal circuit 18, it actually is performed by digitization. More specifically, the binarized signal of the waveform (c) is latched by the latch circuit 33, has its amplitude adjusted by the control signal generation circuit 34 based on the output signal from the amplitude detection circuit 12, and is supplied to the residual component removal circuit 18, where the subtraction processing is performed.

The subtraction shown in the waveform (d) has no effect on a LPP signal Lb located between recording signals (in a space portion). With respect to a LPP signal La on a recording signal (in a mark portion), although an amount corresponding to the level of the binarized signal is subtracted from the LPP signal La, the LPP signal La generally remains at a level necessary for detection.

A waveform (e) shows the case where, when the signal shown in the waveform (d) as a result of the subtraction exceeds a predetermined level (in a negative direction), a binarized signal period is replaced by a reference level signal. This will be described in Embodiment 3.

As described above, with the configuration of the present embodiment, the differential balance and the allocation of the gain are optimized for detecting the wobble, and additional analog circuits for detecting the land pre-pit include only the adder amplifier circuit 30, the LPF 31, and the binarization circuit 32.

In reproduction, the differential balance for detecting the LPP signal also is adjusted so that high-frequency signal components in the vicinity of a recording position of the LPP address signal have the same amplitude. However, the position of this adjustment is different from that in recording. The reason for this is as follows. In recording, a laser as a light source of the optical head has a high output power, and modulated light thereof is reflected by the disk to be mixed in the LPP address signal. On the other hand, in reproduction, a mark recorded in a groove on the disk is mixed as a reproduction signal.

In reproduction, the relationship between a mark and a space is reversed due to the reflectance. More specifically, since a mark portion has a lower reflectance, a low land pre-pit signal is detected in the mark portion, while a high land pre-pit signal is detected in a space portion. However, the relationship in magnitude between the reproduction signal and the land pre-pit signal is the same as that in recording, and thus no change is necessary for the circuit configuration.

(Embodiment 2)

Figure 3:
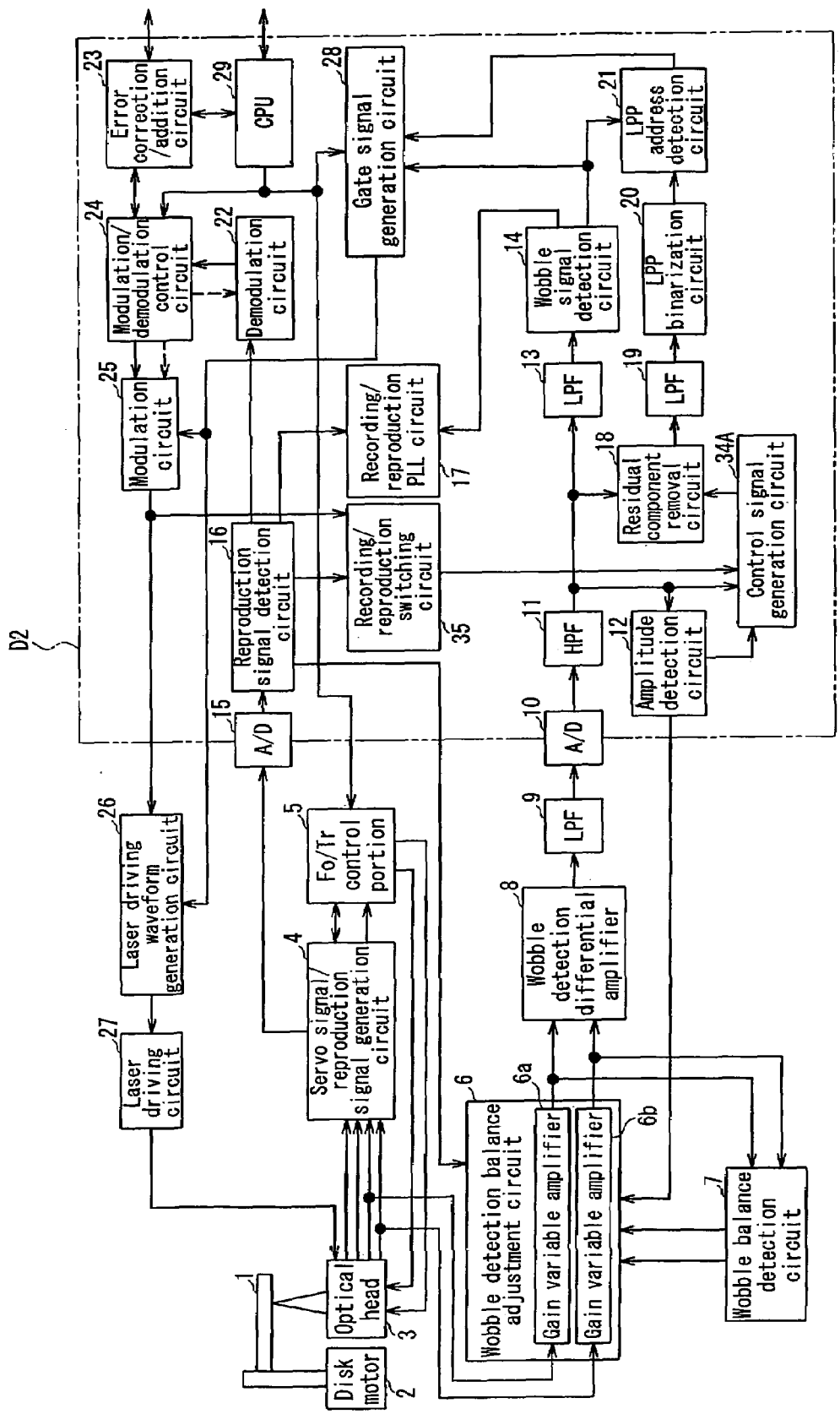
FIG. 3 is a block diagram showing a configuration of an optical disk apparatus according to Embodiment 2.

FIG. 3 is a block diagram showing a configuration of an optical disk apparatus according to Embodiment 2. The same components as those of the optical disk apparatus according to Embodiment 1 shown in FIG. 1 are denoted with the same reference numerals, and repeated descriptions are omitted. The optical disk apparatus of the present embodiment is different from that in Embodiment 1 in that the circuitry from the adder amplifier circuit 30 to the latch circuit 33 in FIG. 1 is not provided. Accordingly, a block D2 that mainly performs digital processing has a different configuration from that in FIG. 1.

A specific difference is as follows: instead of the timing signal output from the latch circuit 33 in Embodiment 1, a recording timing signal is obtained based on a signal supplied to a control signal generation circuit 34A via a recording/reproduction switching circuit 35. To this end, the recording/reproduction switching circuit 35 switches between a recording signal output from the modulation circuit 25 in recording and a reproduction signal output from the reproduction signal detection circuit 16 in reproduction, and supplies one of the signals to the control signal generation circuit 24A.

The control signal generation circuit 34A detects a recording timing signal indicating a recording timing in a waveform of the recording signal or the reproduction signal. The recording timing signal is a signal corresponding to a period during which a residual signal component is generated, like the output from the binarization circuit 32 in FIG. 1. The control signal generation circuit 34A uses the recording timing signal to generate a control signal for removing the residual signal component. Except for the use of the recording timing signal, the basic configuration and operation of the control signal generation circuit 34A can be the same as those of the control signal generation circuit 34 in Embodiment 1.

For the use of the recording timing signal obtained with the above configuration, it is preferable that the control signal generation circuit 34A includes an optimum timing detection circuit for, by using a digitized difference signal supplied from the HPF 11 and the recording timing signal, matching phases of the recording timing signal and the residual signal component in the difference signal.

Figure 4:
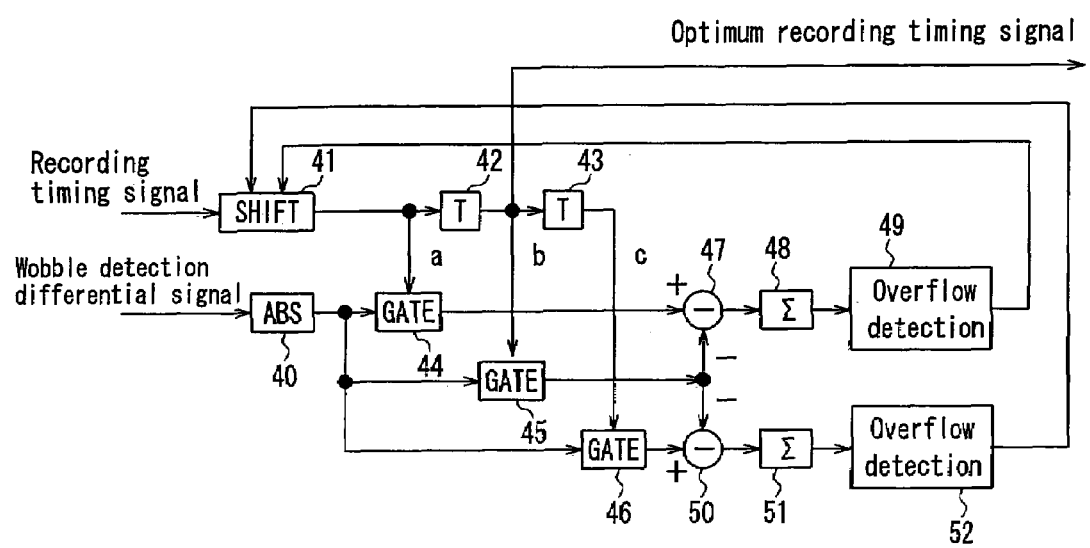
FIG. 4 is a block diagram showing a configuration of an optimum timing detection circuit provided in the optical disk apparatus.

FIG. 4 shows an example of the optimum timing detection circuit. This circuitry includes an absolute value circuit 40 and a shift circuit 41 as input portions. The shift circuit 41 receives the recording timing signal. The recording timing signal that has passed through the shift circuit 41 passes through two delay circuits 42 and 43 sequentially, resulting in recording timing signals a, b, and c of three successive timings. The recording timing signals a, b, and c are supplied as gate signals of three gate circuits 44, 45, and 46, respectively.

The absolute value circuit 40 receives the wobble detection differential signal output from the HPF 11. The wobble detection differential signal is processed by the absolute value circuit 40, and then is supplied to the gate circuits 44, 45, and 46. A subtracter 47 receives the outputs from the gate circuits 44 and 45, and the output signal from the subtracter 47 is processed by an integrator 48 and an overflow detector 49. A subtracter 50 receives the outputs from the gate circuits 45 and 46, and the output signal from the subtracter 50 is processed by an integrator 51 and an overflow detector 52.

When the wobble detection differential signal extracted by the timing signal a among the recording timing signals a, b, and c is the highest, a–b is positive. When the wobble detection differential signal extracted by the timing signal c is the highest, c–b is positive. When the wobble detection differential signal extracted by the timing signal b is the highest, both are negative. In other words, when the timing signal b is optimum, both the outputs from the integrators 48 and 51 are changed in a negative direction. On the other hand, when the timing signal b is not optimum, either of the outputs is changed in a positive direction. On this account, when either one of the outputs from the integrators 48 and 51 has a certain value or more, the shift circuit 41 is changed so that a timing signal that extracts a higher wobble detection differential signal than that extracted by the timing signal b becomes a timing signal b, whereby the timing signal b approximates an optimum timing. By repeating this operation, the timing signal b becomes the optimum timing.

When the integrators 48 and 51 are limited to an appropriate number of bits, and include overflow detection in a positive direction and a limiter in a negative direction, it is possible to control the shift circuit 41 based on the overflow detection. Consequently, when the timing signal b is the optimum timing, the outputs from the integrators 48 and 51 always have values in the vicinity of a limiter value in a negative direction, resulting in stable detection with no effect exerted by a slight variation.

As described above, in a range in which variations in the timing of the recording timing signal with respect to the digitized wobble detection differential signal are covered, the optimum timing detection circuit generates the plurality of recording timing signals whose timings are shifted in units of clock, compares levels of the residual signal in the digitized wobble detection differential signals corresponding to the respective timing signals, and selects the timing signal for the highest residual signal level.

Factors that may affect the timing of an approximate residual signal are considered to include a differential delay of the analog circuit portion and a time difference between the A/D converter and the latch circuit. The difference signal and the sum signal can be matched relatively in the analog portion, and a delay time after the A/D converter can be compensated. Thus, in this case, it is possible to reduce the differential delay to within one clock. However, when a binarized signal is latched with a clock, a one-clock error necessarily occurs stochastically in principle.

On the other hand, when a modulation signal or a reproduction signal is used, it is highly likely that variations in differential delay of one clock or more occur. In particular, in recording, light passes through many systems such as the laser, the optical system, and the received ray system, which results in large variations.

To solve this problem, variations in differential delay over one clock can be reduced as follows. That is, as described above, accumulated absolute values of the difference signal in a recording signal pulse section are compared to detect an optimum timing, whereby the variations in differential delay over one clock can be reduced to a timing lag of one clock or less. The difference signal includes a wobble signal, a land pre-pit signal, and noise, and has the highest proportion of residual signal component. Thus, when the residual signal component and the recording timing signal are in phase, and the residual signal component is extracted entirely, the accumulated absolute value provides the highest output. Since the residual signal component can have a positive or negative value, the sum of squares is used to be exact as in noise detection. However, sufficient performance can be obtained simply by using the absolute value.

As described above, with the configuration of the present embodiment, the differential balance and the allocation of the gain are optimized for detecting the wobble, and the additional analog circuit for detecting the land pre-pit is not necessary.

(Embodiment 3)

An optical disk apparatus according to Embodiment 3 will be described with reference to a waveform diagram in FIG. 5. The optical disk apparatus of the present invention basically has the same configuration as that of the optical disk apparatus in Embodiment 1 shown in FIG. 1 or in Embodiment 2 shown in FIG. 3. The present embodiment is different from the above embodiments in that the control signal generation circuit 34 (34A) in FIG. 1(3) is configured to operate as follows.

That is, in the optical disk apparatus of the present embodiment, the control signal generation circuit 34(34A) in FIG. 1(3) is configured to include an approximate residual signal generation circuit. The approximate residual signal generation circuit has a table on which data on a correspondence between a recording timing signal and an amplitude are recorded, and uses the correspondence data to generate an approximate residual signal based on the recording timing signal. The approximate residual signal is a signal whose waveform is approximated to that of a recording timing signal that is limited to the same band as that of the output signal from the wobble detection differential amplifier 8.

To describe the significance of the approximate residual signal, a more detailed description will be given initially of the functions of the residual component removal circuit 18 and the control signal generation circuit 34(34A) in FIG. 1(3) shown in the waveform diagram in FIG. 2.

The wobble detection balance adjustment circuit 6 optimizes the outputs from the tracking detectors A and B for detecting a wobble, the optimized two signals being referred to as va and vb. The difference signal at this time is (va−vb).

Next, an optimum balance for detecting a LPP is expressed as follows:

(1−k)×va and (1+k)×vb.

The difference signal therebetween is expressed as follows:

$$(va-vb)-k\times(va+vb). \quad (1)$$

In other words, the optimum balance for detecting a LPP is obtained by subtracting a signal obtained by multiplying the sum signal by an appropriate coefficient from the optimum difference signal for detecting a wobble.

As stated above, when a LPP signal and a recording signal overlap each other, the LPP signal detected in the difference signal has its amplitude affected greatly, resulting in a larger imbalance in the level of the recording signal detected by the detector. In other words, the LPP signal with a large amplitude is generated in the difference signal.

On the other hand, when the recording signal and the LPP signal do not overlap each other, the LPP signal is detected at the same level as that in the case of the absence of the recording signal. The reason that it is difficult to detect the LPP signal is as follows. That is, when the recording signal and the LPP signal do not overlap each other in timing, a detected LPP signal component is smaller than an imbalance component of a recording signal around the LPP signal, and bands of these two signals are almost in agreement with each other, and therefore the detection of the LPP signal is impossible in this state.

To solve this problem, attention is directed to the case where the LPP signal and the recording signal do not overlap each other. When the value of the coefficient k in the above equation (1) is increased, a recording signal portion is enlarged increasingly in a reversed polarity direction. However, since the LPP signal is not present in this portion, the level of the LPP signal remains totally unaffected. On the other hand, when the LPP signal and the recording signal overlap each other, the LPP signal component is amplified, and thus almost no effect is exerted even when the sum signal is subtracted at a somewhat increased rate.

Specifically, the lower limit of an optimum value of k is a value that allows the maximum residual signal component of the recording signal having the same polarity as that of the LPP signal to be eliminated. The upper limit is a level at which the LPP signal is decreased extremely by subtracting the sum signal and it becomes impossible to detect the LPP signal due to noise other than the residual signal component in a portion where the LPP signal and the recording signal overlap each other. For example, in the case where the LPP signal component is twice as high as the residual signal component, when the same level as that of the residual signal component is subtracted, the LPP signal is reduced to half, and the residual signal component is eliminated. Noise other than the residual signal component at this time is far lower than this level and thus poses no problem in detecting the LPP.

From a different perspective, a high degree of accuracy is not needed for the level of the sum signal to be subtracted. That is to say, the sum signal can be replaced by a binary signal (1-bit signal). Further, it is possible to make a setting so that the residual signal is removed entirely by matching the level of the binary signal with the maximum amplitude of the residual signal or by making the level slightly higher than the maximum amplitude. This binary signal can be obtained by using a recording/reproduction signal, as well as by using the sum signal. The sum signal in recording is generated by a laser waveform itself, and a cycle of the binary signal is equal to that of a modulation signal in recording and is equal to that of a binarized reproduction signal of information in reproduction.

In the above embodiment, it is assumed that the sum signal is subtracted from the difference signal, and that a binarized signal is used as the sum signal. Since accuracy is not needed for the amplitude of the sum signal, it is possible to use the modulation signal for generating a laser driving waveform in recording and to use the reproduction signal in reproduction, as well as to use the directly binarized sum signal.

An important technique for using the binarized signal involves the timing and level of the approximate residual signal to be generated for removing the residual signal component. The level of the approximate residual signal is determined by the wobble detection balance adjustment circuit 6.

Note here that the wobble detection balance adjustment circuit 6 has three functions. The first function is to keep an optimum amplitude balance between the detection signals from the tracking detectors A and B for detecting a wobble. The second function is to keep a ratio among the wobble signal component included in the output signal from the wobble detection differential amplifier 8, the imbalance residual signal level of the recording/reproduction signal, and the LPP signal level constant, thereby detecting a wobble and a LPP efficiently on a digital processing side. The third function is to operate based on the presence/absence of the recording signal detected by the reproduction signal detection circuit 15 and to operate as a fixed gain amplifier in an unrecorded track portion.

The level of the approximate residual signal is obtained by detecting a maximum value of the residual signal component having the same polarity as that of the LPP signal component in the difference signal. When the wobble detection balance adjustment circuit 6 performs control so as to keep the amplitude constant, a target level thereof can be used as a substitute.

Although the binary signal with the above level can be used as the approximate residual signal, the detection rate deteriorates slightly when a part of the recording signal with a long cycle and the LPP signal overlap each other. On the other hand, when a ternary signal or a quaternary signal is used as the approximate residual signal, the detection rate can be improved. It is determined based on the standard that a pulse with the largest width is arranged on a specific LPP signal, and thus the above measures are available.

Figure 5:
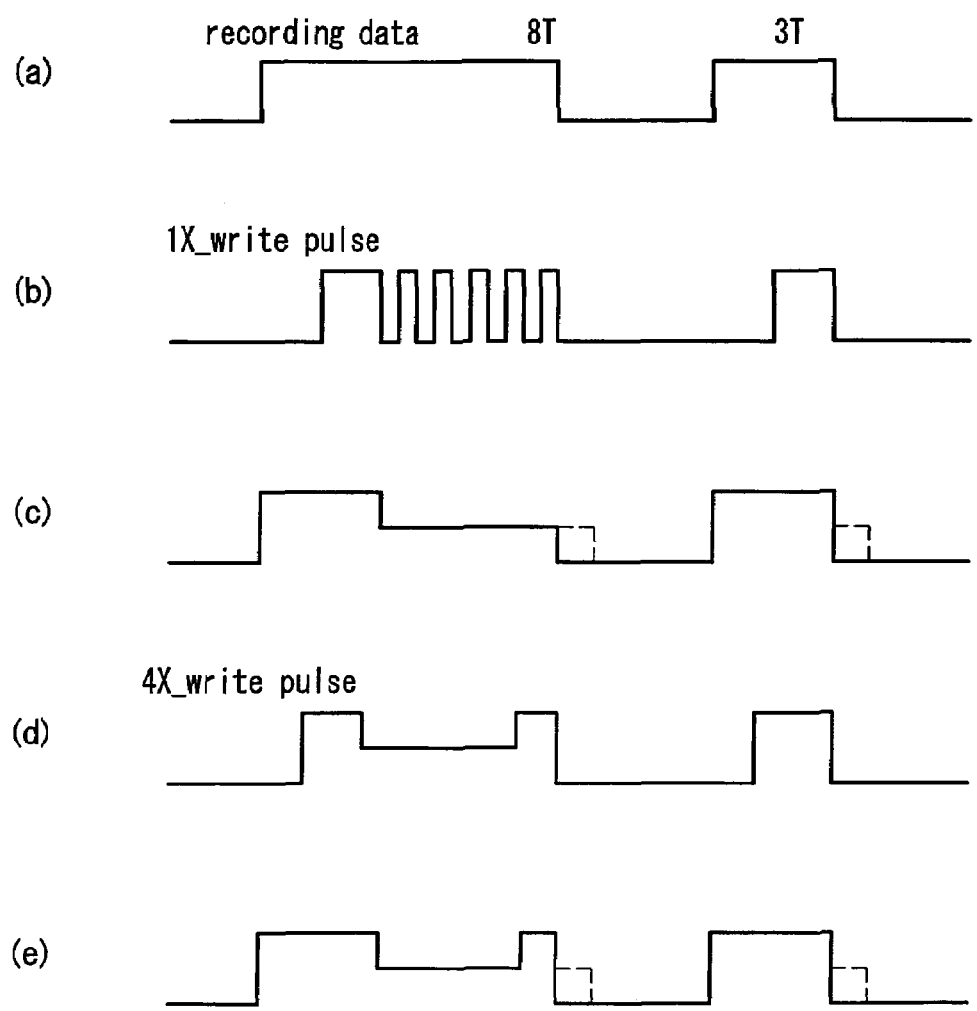
FIG. 5 is a waveform diagram for explaining an operation of an optical disk apparatus according to Embodiment 3.

FIG. 5 is a waveform diagram for explaining the relationship between a write strategy in a typical recording mode and a signal level of the approximate residual signal. A waveform (a) shows a recording signal with a 8T width and a 3T width, a waveform (b) is a laser emission waveform in single-speed recording, and a waveform (c) is an approximate residual signal waveform at that time. A waveform (d) is a laser emission waveform in quadruple-speed recording, and a waveform (e) is an approximate residual signal waveform at that time. Each of the waveforms (c) and (e) is an amplitude waveform obtained when a ternary signal is used as the approximate residual signal, and the level in a rising portion is increased since an overshoot generally is seen in the rising portion. Further, since the width is likely to be increased due to band-limitation, the width of the approximate signal is increased as shown by a broken line portion.

In high-speed recording, a period during which a light emission level is zero is provided as a cooling pulse after a recording pulse. This portion is regarded only as an offset due to noise and a differential imbalance. Thus, it is available to increase the width in accordance with the adopted standard of the optical disk apparatus so as to remove an unwanted component in this portion.

The polarities of the residual signal component and the approximate residual signal are in phase around a land pre-pit side of a wobble signal and in opposite phase on a peak side where no land pre-pit is present. Therefore, when the approximate residual signal is subtracted from the difference signal having the residual signal component, it is canceled on the same phase side and is added on the opposite phase side showing a high value on the opposite phase side. Even in this state, there is no problem in most cases in detecting a land pre-pit. However, when the signal that has passed through the low-pass filter 19 swings greatly to the opposite phase side around a land pre-pit, the level of the land pre-pit is affected, and the detection rate may deteriorate. To avoid this, the signal may be limited to a value of zero or a value approximate thereto during a period in which the signal is in opposite phase to the land pre-pit in the output waveform from the residual component removal circuit 18. The residual signal component in opposite phase may be output as it is without subtraction.

Based on the symmetry property of the waveform, it is possible that the approximate residual signal is subtracted in an in-phase portion and is clipped at zero in a portion of zero or less, and that the approximate residual signal is added in an opposite phase portion and is clipped at zero in a portion of zero or more. Further, instead of the subtraction, the signal may be compressed (replaced by a reference level) toward a direction of zero (reference level) in accordance with the approximate residual signal (binary value is also possible), except for a portion exceeding a predetermined level. In other words, it is possible that during a period in which a binary signal is present, the difference signal is replaced by the reference level, and a land pre-pit signal buried in the residual signal is detected and at the same time, an amplified land pre-pit signal is detected with reference to a level higher than the residual signal in the difference signal.

The above description refers to the case where the difference signal is digitized and processed. However, it is also possible that the sum signal is binarized, the difference signal is replaced by the reference level in accordance with the binarized signal, and a land pre-pit signal buried in the residual signal is detected simply by analog processing (see the waveform (e) in FIG. 2).

According to the embodiments of the present invention, in the system in which the differential amplifier circuit is used for detecting both the modulation signal and the LPP address, and the difference signal output from the differential amplifier circuit is digitized to detect the modulation signal and the LPP address by a digital operation, it is possible to remove the residual signal component that remains in the difference signal and hinders detection of the LPP address, by a simple circuit configuration based on the binareized sum signal of the two detection signals from the tracking detectors A and B that are to be input to the differential amplifier circuit, even when the amplitude balance between the two detection signals is optimized for detecting a wobble signal.

Therefore, with respect to an optical disk (such as DVD-R/RW) on which no address information for recording is formed on a track for recording information, it is possible to increase the detection rate of the address information and at the same time, to reduce an unstable analog circuit that causes large variations in property, regardless of a recording/reproductions state of the optical disk apparatus.

The tracking detector 5 may be divided into a larger number (e.g., 4 or 6) of detectors, instead of the two tracking detectors A and B. In such a case, the sum of the plurality of detectors divided by a dividing line extending along tracks can be treated as the above two tracking detectors A and B. More specifically, the differential signal indicates a difference between an average value of outputs from the detectors arranged on one side of the dividing line and an average value of outputs from the detectors arranged on the other side.

INDUSTRIAL APPLICABILITY

According to the present invention, it is possible to provide the optical disk apparatus that can detect a wobble signal and a LPP signal with a simple configuration.

The invention claimed is:

1. An optical disk apparatus that reads predetermined information including address information for determining a position and wobble information from an optical disk having tracks in which information is to be recorded and that form a wobble of a predetermined cycle and gap portions between the tracks in which the address information is recorded, the optical disk apparatus comprising:
an optical head having a tracking detector for detecting a first detection signal and a second detection signal by first and second detectors, respectively, arranged on both sides of a dividing line that extends in a longitudinal direction of the tracks, based on reflected light of a laser beam irradiated onto the optical disk;
a wobble detection balance adjustment circuit for receiving the first detection signal and the second detection signal, making an adjustment so that a signal level of the first detection signal is equal to a signal level of the second detection signal, and outputting the respective detection signals;
a wobble detection differential circuit for generating a wobble detection differential signal indicating a difference between the first detection signal and the second detection signal whose signal levels have been adjusted by the wobble detection balance adjustment circuit;
an analog-to-digital conversion circuit for digitizing the wobble detection differential signal generated by the wobble detection differential circuit;
a wobble signal detection circuit for detecting a wobble signal based on the wobble detection differential signal digitized by the analog-to-digital conversion circuit;
an adder circuit for generating a sum signal indicating a sum of the first detection signal and the second detection signal whose signal levels have been adjusted by the wobble detection balance adjustment circuit;
a binarization circuit for comparing the sum signal generated by the adder circuit with a predetermined level of signal, and converting the sum signal into a binarized signal;
a latch circuit for latching the output signal from the binarization circuit with a conversion clock of the analog-to-digital conversion circuit or a clock with a frequency that is an integral multiple of a frequency of the conversion clock, and converting the output signal into a recording timing signal;
a control signal generation circuit for generating a control signal for removing a residual signal component as a residual component of a recording signal included in the digitized wobble detection differential signal, based on the recording timing signal output from the latch circuit and the digitized wobble detection differential signal;
a residual component removal circuit for removing the residual signal component included in the digitized wobble detection difference signal based on the control signal supplied from the control signal generation circuit, so as to extract a land pre-pit detection signal; and
an address detection circuit for detecting the address information based on the land pre-pit detection signal output from the residual component removal circuit.

2. The optical disk apparatus according to claim 1, further comprising: an amplitude detection circuit for detecting an amplitude of a mixed signal of the wobble signal included in the digitized wobble detection differential signal and the residual signal component correlated with the sum signal, the recording signal, or the reproduction signal,
wherein the wobble detection balance adjustment circuit includes a first gain variable amplifier for varying the level of the first detection signal, and a second gain variable amplifier for varying the level of the second detection signal, and
the wobble detection balance adjustment circuit has a first function of adjusting a gain of the first gain variable amplifier and a gain of the second gain variable amplifier so that the level of the first detection signal is equal to the level of the second detection signal, a second function of adjusting the gains of the first gain variable amplifier and the second gain variable amplifier so that the mixed signal is input to the analog-to-digital conversion circuit at a predetermined level based on the output from the amplitude detection circuit, and a third function of making the gains of the first gain variable amplifier and the second gain variable amplifier constant when reproduction is performed from a track in which the recording signal is not recorded.

3. The optical disk apparatus according to claim 2,
wherein the control signal generation circuit generates as the control signal an approximate residual signal that is approximate to the residual signal component, and sets an amplitude of the approximate residual signal based on the output from the amplitude detection circuit; and
the residual component removal circuit subtracts the approximate residual signal from the residual signal component having the same polarity as that of the land pre-pit.

4. The optical disk apparatus according to claim 1,
wherein the control signal generation circuit generates as the control signal an approximate residual signal that is approximate to the residual signal component, and
the residual component removal circuit subtracts the approximate residual signal from the residual signal component having the same polarity as that of the land pre-pit.

5. The optical disk apparatus according to claim 4, wherein the approximate residual signal is a signal generated by approximating a recording signal waveform based on a write strategy adopted by the optical disk apparatus to that of the wobble detection differential signal that has passed through the recording/reproduction system and the signal processing system of the optical disk apparatus.

6. The optical disk apparatus according to claim 4, wherein when a waveform obtained as a result of the subtraction by the residual component removal circuit includes a portion exceeding a predetermined level, the portion exceeding the predetermined level is replaced by a reference level signal.

7. The optical disk apparatus according to claim 6, wherein the reference level signal is a signal generated based on a low-frequency component in a portion that does not correspond to the residual signal component in the digitized wobble detection differential signal.

8. The optical disk apparatus according to claim 1, wherein the residual component removal circuit replaces the residual signal component included in the digitized wobble detection differential signal with a reference level signal during a period corresponding to the recording timing signal.

9. The optical disk apparatus according to claim 8, wherein the reference level signal is a signal generated based on a low-frequency component in a portion that does not correspond to the residual signal component in the digitized wobble detection differential signal.

10. The optical disk apparatus according to claim 1, wherein during a period in which the land pre-pit signal is located at a position where a recording signal is detected, a signal that is not subjected to the processing of removing the residual signal component is used as the land pre-pit detection signal.

11. An optical disk apparatus that reads predetermined information including address information for determining a position and wobble information from an optical disk having tracks in which information is to be recorded and that forms a wobble of a predetermined cycle and gap portions between the tracks in which the address information is recorded, the optical disk apparatus comprising:

an optical head having a tracking detector for detecting a first detection signal and a second detection signal by first and second detectors, respectively, arranged on both sides of a dividing line that extends in a longitudinal direction of the tracks, based on reflected light of a laser beam irradiated onto the optical disk;

a recording signal generation circuit for generating a recording signal for recording information in the tracks;

a laser driving circuit for driving a laser of the optical head based on the recording signal output from the recording signal generation circuit;

a reproduction signal generation circuit for detecting the recording signal recorded in the tracks, and outputting a reproduction signal;

a wobble detection balance adjustment circuit for receiving the first detection signal and the second detection signal, making an adjustment so that a signal level of the first detection signal is equal to a signal level of the second detection signal, and outputting the respective detection signals;

a wobble detection differential circuit for generating a wobble detection differential signal indicating a difference between the first detection signal and the second detection signal whose signal levels have been adjusted by the wobble detection balance adjustment circuit;

an analog-to-digital conversion circuit for digitizing the wobble detection differential signal generated by the wobble detection differential circuit;

a wobble signal detection circuit for detecting a wobble signal based on the wobble detection differential signal digitized by the analog-to-digital conversion circuit;

a control signal generation circuit for generating a control signal for removing a residual signal component as a residual component of a recording signal included in the digitized wobble detection differential signal based on a recording timing signal obtained based on at least one of the output signals from the recording signal generation circuit and the reproduction signal generation circuit and the wobble detection differential signal;

a residual component removal circuit for removing the residual signal component included in the digitized wobble detection difference signal based on the control signal supplied from the control signal generation circuit, so as to extract a land pre-pit detection signal; and an address detection circuit for detecting the address information based on the land pre-pit detection signal output from the residual component removal circuit.

12. The optical disk apparatus according to claim 11, wherein the control signal generation circuit includes an optimum timing detection circuit for generating a plurality of test timing signals by shifting a timing of the recording timing signal in units of clock, comparing levels of the residual signal component in the digitized wobble detection differential signal in periods corresponding to the respective test timing signals, and selecting a test timing signal corresponding to a period in which the absolute value level of the residual signal component is the highest, and uses the selected test timing signal as the recording timing signal for generating the control signal.

13. The optical disk apparatus according to claim 12, wherein the optimum timing detection circuit selects one of the test timing signals arbitrarily, cumulatively adds values obtained by subtracting an absolute value level of the residual signal component corresponding to the selected test timing signal from absolute value levels of the residual signal component corresponding to test timing signals before and after the selected test timing signal, respectively, and, when either of the cumulative values reaches a predetermined positive level, selects a test timing signal on a side of the cumulative value that reaches the predetermined positive level as an output signal, and performs the above processing repeatedly with respect to the selected test timing signal.

14. The optical disk apparatus according to claim 11, further comprising: an amplitude detection circuit for detecting an amplitude of a mixed signal of the wobble signal included in the digitized wobble detection differential signal and the residual signal component correlated with the sum signal, the recording signal, or the reproduction signal, wherein the wobble detection balance adjustment circuit includes a first gain variable amplifier for varying the level of the first detection signal, and a second gain variable amplifier for varying the level of the second detection signal, and the wobble detection balance adjustment circuit has a first function of adjusting a gain of the first gain variable amplifier and a gain of the second gain variable amplifier so that the level of the first detection signal is equal to the level of the second detection signal, a second function of adjusting the gains of the first gain variable amplifier and the second gain variable amplifier so that the mixed signal is input to the analog/digital conversion circuit at a predetermined level based on the output from the amplitude detection circuit, and a third function of making the gains of the first gain variable amplifier and the second gain variable amplifier constant when reproduction is performed from a track in which the recording signal is not recorded.

15. The optical disk apparatus according to claim 14, wherein the control signal generation circuit generates an approximate residual signal that is approximate to the residual signal component as the control signal, and sets an amplitude of the approximate residual signal based on the output from the amplitude detection circuit; and the residual component removal circuit subtracts the approximate residual signal from the residual signal component having the same polarity as that of the land pre-pit.

16. The optical disk apparatus according to claim 11,
wherein the control signal generation circuit generates an approximate residual signal that is approximate to the residual signal component as the control signal, and
the residual component removal circuit subtracts the approximate residual signal from the residual signal component having the same polarity as that of the land pre-pit.

17. The optical disk apparatus according to claim 14, wherein the approximate residual signal is a signal generated by approximating a recording signal waveform based on a write strategy adopted by the optical disk apparatus to that of the wobble detection differential signal that has passed through the recording/reproduction system and the signal processing system of the optical disk apparatus.

18. The optical disk apparatus according to claim 16, wherein when a waveform obtained as a result of the subtraction by the residual component removal circuit includes a portion exceeding a predetermined level, the portion exceeding the predetermined level is replaced by a reference level signal.

19. The optical disk apparatus according to claim 18, wherein the reference level signal is a signal generated based on a low-frequency component in a portion that does not correspond to the residual signal component in the digitized wobble detection differential signal.

20. The optical disk apparatus according to claim 11, wherein the residual component removal circuit replaces the residual signal component included in the digitized wobble detection differential signal with a reference level signal during a period corresponding to the recording timing signal.

21. The optical disk apparatus according to claim 20, wherein the reference level signal is a signal generated based on a low-frequency component in a portion that does not correspond to the residual signal component in the digitized wobble detection differential signal.

22. The optical disk apparatus according to claim 11, wherein during a period in which the land pre-pit signal is located at a position where a recording signal is detected, a signal that is not subjected to the processing of removing the residual signal component is used as the land pre-pit detection signal.

* * * * *